United States Patent
Dabezies et al.

(10) Patent No.: US 7,213,521 B1
(45) Date of Patent: May 8, 2007

(54) METHOD FOR WELDING OVERLAPPING METAL SHEETS AND CORRESPONDING RAILWAY CAR BODY

(75) Inventors: Bernard Dabezies, Neuilly sur Seine (FR); Pascal Delroise, Valenciennes (FR)

(73) Assignee: Alstom Holdings, Paris (FR)

(*) Notice: Subject to any disclaimer, the term of this patent is extended or adjusted under 35 U.S.C. 154(b) by 0 days.

(21) Appl. No.: 09/462,206

(22) PCT Filed: May 17, 1999

(86) PCT No.: PCT/FR99/01172

§ 371 (c)(1),
(2), (4) Date: Apr. 28, 2000

(87) PCT Pub. No.: WO99/59769

PCT Pub. Date: Nov. 25, 1999

(30) Foreign Application Priority Data

May 18, 1998 (FR) .................................. 98 06254

(51) Int. Cl.
*B61D 17/00* (2006.01)
*B23K 26/00* (2006.01)
(52) U.S. Cl. .................................. 105/401; 219/121.64
(58) Field of Classification Search .......... 219/121.64, 219/121.63; 105/396, 401, 238.1
See application file for complete search history.

(56) References Cited

U.S. PATENT DOCUMENTS

| 2,190,334 A | * | 2/1940 | Nystrom ..................... 105/401 |
| 2,504,656 A | * | 4/1950 | Dean ............................ 105/397 |
| 3,618,817 A | | 11/1971 | Troughton |
| 3,935,688 A | * | 2/1976 | Trojahn et al. ............ 52/592.1 |
| 5,383,592 A | | 1/1995 | Fussnegger et al. |
| 6,060,682 A | * | 5/2000 | Westbroek et al. .... 219/121.64 |

FOREIGN PATENT DOCUMENTS

| EP | 049 845 | | 10/1981 |
| GB | 584368 | | 1/1947 |
| JP | 0174940 A | * | 5/1993 |
| JP | 0245063 A | * | 9/1999 |
| WO | 92/00829 | | 1/1992 |

* cited by examiner

*Primary Examiner*—S. Joseph Morano
*Assistant Examiner*—Robert J. McCarry, Jr.
(74) *Attorney, Agent, or Firm*—Sughrue Mion, PLLC

(57) ABSTRACT

A first (5) of the sheets has, near the zone (6) of overlap, stiffening parts (74) designed to resist the bending of the sheet along the zone of overlap. At least one region of the first sheet (5) is made to project, cantilever fashion, into the zone (6) of overlap. The stiffening parts are located near this cantilevered region. A pressing mechanism of a laser welding installation (2) is made to press against another sheet (4) to hold the sheets in contact with one another at the zone (6) of overlap. The laser welding installation is used to weld the sheets together along the zone of overlap. Application to the welding together, by transparency-welding, of sheets of the external skin of railway vehicle bodies.

7 Claims, 3 Drawing Sheets

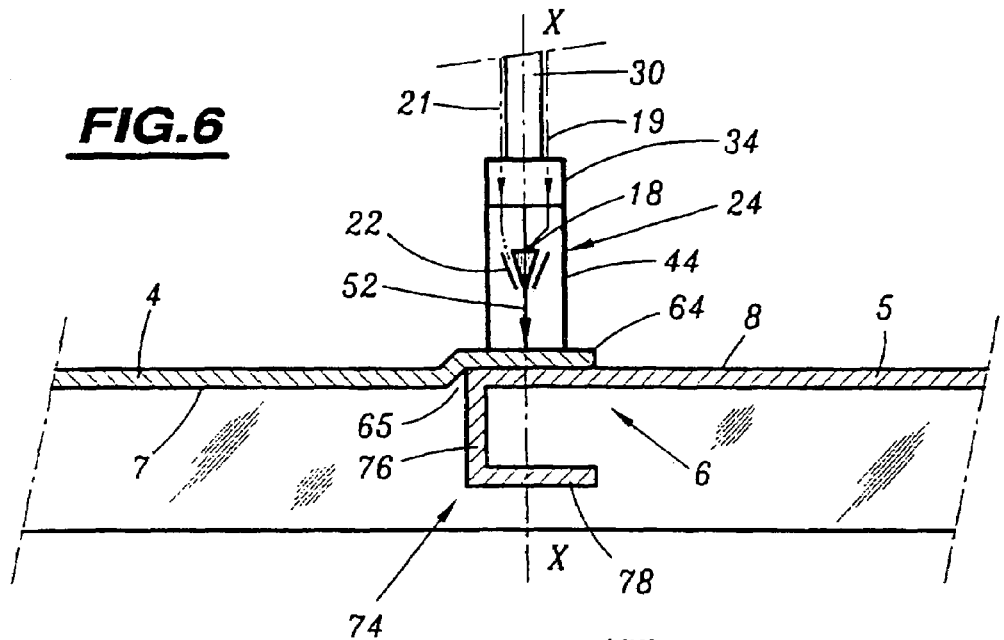
FIG.6
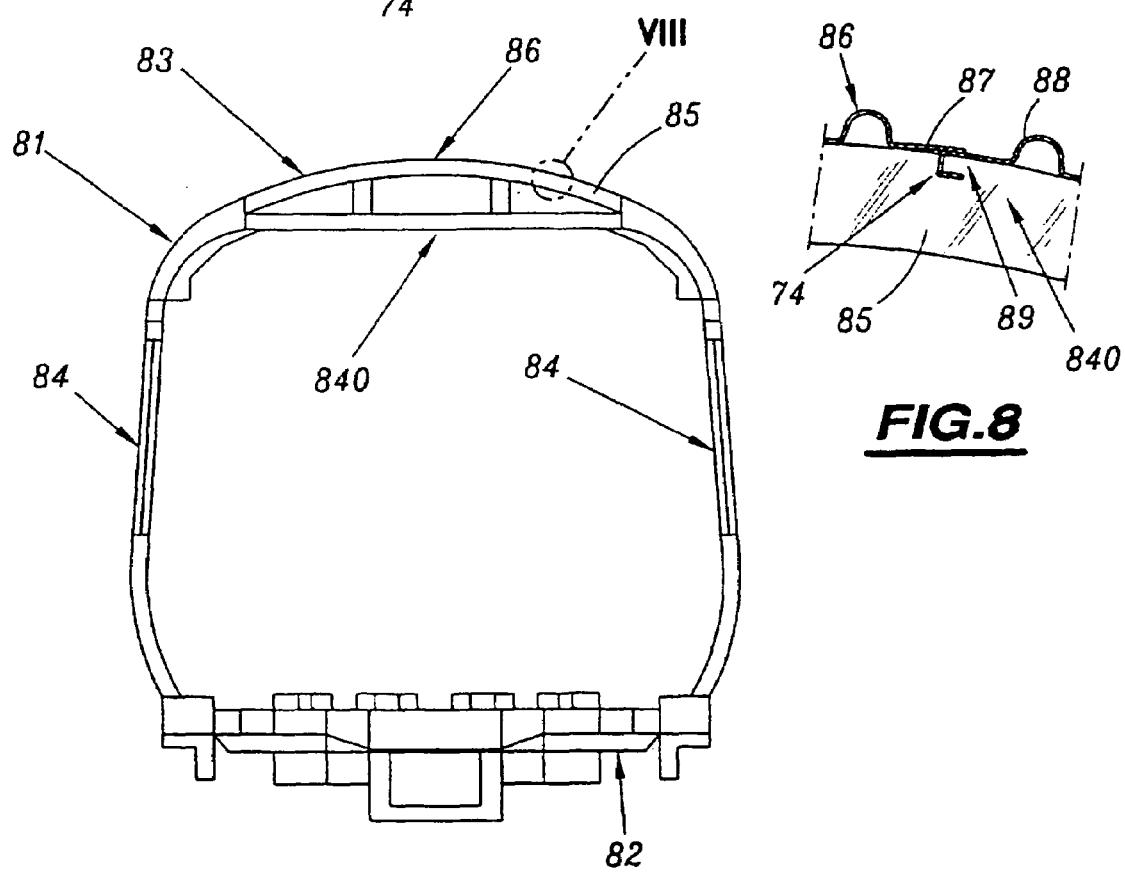
FIG.8
FIG.7

METHOD FOR WELDING OVERLAPPING METAL SHEETS AND CORRESPONDING RAILWAY CAR BODY

BACKGROUND OF THE INVENTION

The present invention relates to a sheet to be welded to another sheet along a zone of overlap between the two sheets.

The invention applies in particular to the transparency-welding of external body skin panels made of steel sheet for railway vehicles.

Laser transparency-welding allows metal parts to be welded together at their surfaces that face one another in a zone of overlap.

To form a weld between these opposing surfaces in this zone where they are inaccessible, the laser beam impinging on one of the parts passes right through this part and melts the other part. The molten metal solidifies after the laser beam has passed, to form a welded seam.

The use of this transparency-welding technique requires the clearance between the opposing surfaces of the parts that are to be welded to be less than 10% of the total thickness of the zone of overlap.

This constraint on the clearance poses problems in applying this welding technique to railway vehicle exterior body skin panels because of the long lengths over which they need to be welded, it being possible for these lengths typically to be as much as 30 m.

In other fields and for small parts, uniformly spaced rams which clamp the two parts together along the entire length to be welded of the zone of overlap are used in order to comply with this constraint on clearance.

However, this solution would be particularly expensive for welding parts together over relatively long lengths, because of the proliferation in the number of rams.

SUMMARY OF THE INVENTION

The object of the invention is to solve this problem by supplying a sheet which can be welded relatively simply and economically at a relatively long zone of overlap.

To this end, the subject of the invention is a sheet that is to be welded to another sheet along a zone of overlap between the two sheets, characterized in that the sheet comprises, near the zone of overlap, stiffening means designed to resist the bending of the sheet along the zone of overlap when a pressing mechanism of a laser welding installation presses against the other sheet.

According to particular embodiments, the sheet may have one or more of the following features, taken in isolation or in any technically possible combination:

the stiffening means comprise a profiled part formed as an integral part of the first sheet;
the profiled part is formed by bending the sheet away from the zone of overlap, close thereto; and
the profiled part is a thickened part of the sheet.

Another subject of the invention is a collection of sheets which are intended to be welded together along a zone of overlap, characterized in that at least one of the sheets is a sheet as defined hereinabove.

A further subject of the invention is a method of laser welding at least two sheets along a zone of overlap of these sheets, characterized in that at least a first of the sheets is a sheet as defined hereinabove, in that at least one region of the first sheet is made to project, cantilever fashion, into the zone of overlap, the stiffening means being located near this cantilevered region, in that a pressing mechanism of a laser welding installation is made to press against another sheet to hold the sheets in contact with one another in the region of the zone of overlap, and in that the laser welding installation is used to weld the sheets together along the zone of overlap.

According to an alternative form, a laser beam emitted by the welding installation passes through the other sheet to weld it to the sheet at those of their surfaces which face one another in the zone of overlap, the method thus constituting a laser transparency-welding method.

A final subject of the invention is a railway vehicle body comprising at least one support framework and an external skin, the external skin comprising a collection of sheets welded together at zones of overlap and welded to the support structure, characterized in that welds connecting the sheets of the skin together are produced by a method as defined hereinabove.

BRIEF DESCRIPTION OF THE DRAWINGS

The invention will be better understood from reading the description which will follow, given merely by way of example and made with reference to the appended drawings, in which:

FIG. 6 is a diagrammatic view in section along the line VI—VI of FIG. 5 which illustrates the use of the installation of FIG. 1 for welding the sheets of FIG. 5, FIG. 7 is a diagrammatic section of a railway vehicle body, and FIG. 8 is an enlarged sectioned view of the part ringed VIII in FIG. 7.

DETAILED DESCRIPTION OF THE INVENTION

Figure 1:
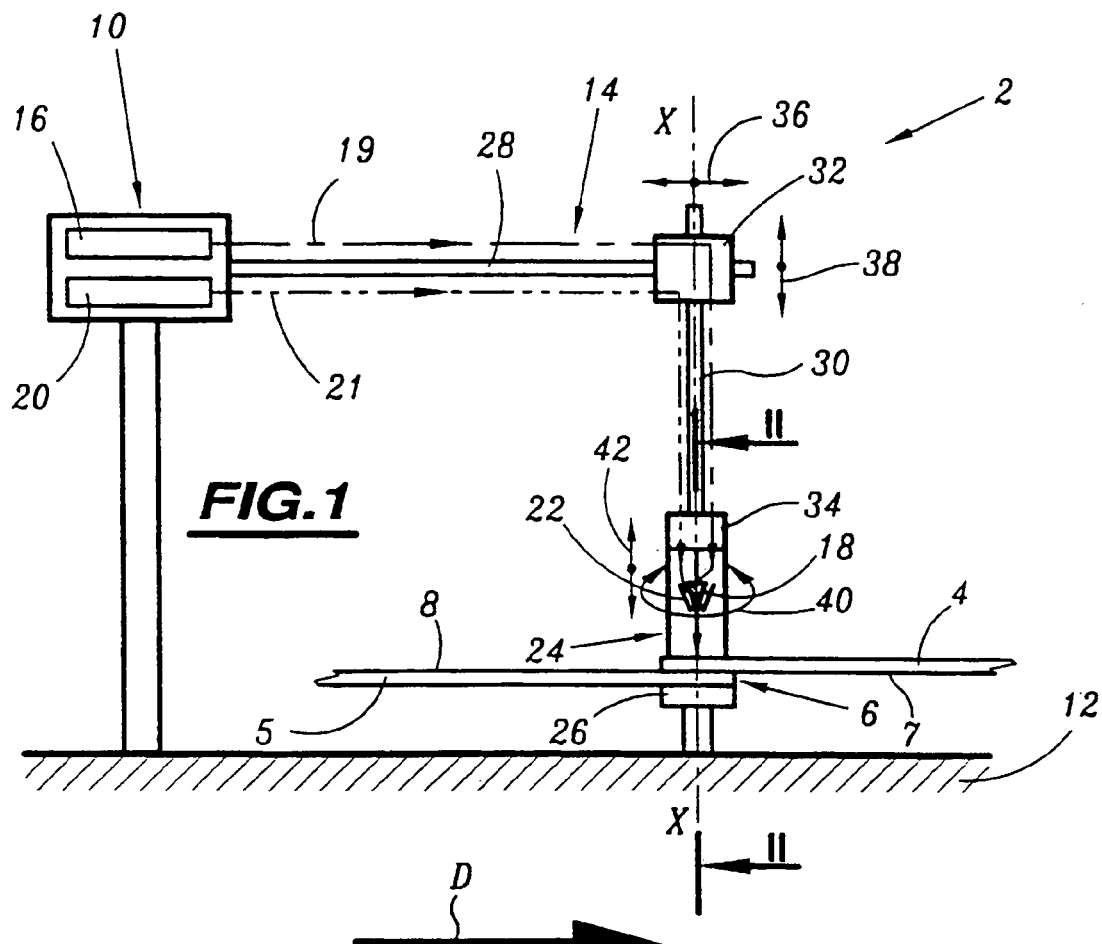
FIG. 1 is a diagrammatic view in elevation of a laser welding installation according to the invention.

FIG. 1 depicts a laser welding installation 2 for welding together two steel sheets 4 and 5 which overlap along a zone 6 of overlap. The sheet 4 is placed on top (at the top in FIG. 1) of the sheet 5 in the zone 6 of overlap. The underside 7 (at the bottom in FIG. 1) of the sheet 4 faces the upper surface 8 of the sheet 5 in the zone 6 of overlap. The sheets 4 and 5 are immobilized one with respect to the other by means which have not been depicted.

The installation 2 essentially comprises:

a stand 10 secured to the ground 12 and raised off the latter, a support structure 14 mounted on the stand 10, a laser source 16 mounted on the stand 10, a head 18 for focusing a laser beam, the head being optically coupled to the laser source 16 by optical-coupling means 19 (shown in chain line), a source 20 of inert gas, a nozzle 22 for spraying inert gas, this nozzle being borne by the head 18 and connected to the source 20 of inert gas by connecting means 21 (depicted in double-dash chain line), a pressing mechanism 24 which is borne by the structure 14, and a base 26 for retaining the second sheet 5 and which is secured to the ground 12 and arranged at a lower level than the stand 10.

The structure 14 comprises two substantially mutually orthogonal rods 28 and 30, a carriage 32 and a mount 34.

The rod 28, which is substantially horizontal, is mounted on the stand 10 so that it can slide in a horizontal direction orthogonal to the plane of FIG. 1. The carriage 32 is mounted so that it can slide horizontally along the rod 28, as depicted diagrammatically by the arrows 36.

The rod 30 extends substantially vertically from the carriage 32 downwards and towards the zone 6 of overlap. The rod 30 is mounted so that it can slide vertically along the carriage 32, as depicted diagrammatically by the arrows 38.

The mount 34 extends the rod 30 downwards. This mount 34 is mounted so that it can rotate on the rod 30 about the axis X—X of the rod 30, as depicted diagrammatically by the arrows 40.

The structure 14 bears the optical-coupling means 19 and the connecting means 21.

The head 18 and the nozzle 22 which surrounds the head 18 are coaxial with the rod 30 and with the mount 34. The axis X—X of the rod 30 is substantially orthogonal to the zone 6 of overlap and the head 18 and the nozzle 22 are orientated towards this zone 6.

The head 18 and therefore the nozzle 22 are mounted so that they can slide vertically on the mount 34, as depicted diagrammatically by the arrows 42, while the pressing mechanism 24 is secured to the mount 34. Thus, the head 18 and the nozzle 22 can be moved up closer to the zone 6 of overlap independently of the pressing mechanism 24.

Figure 2:
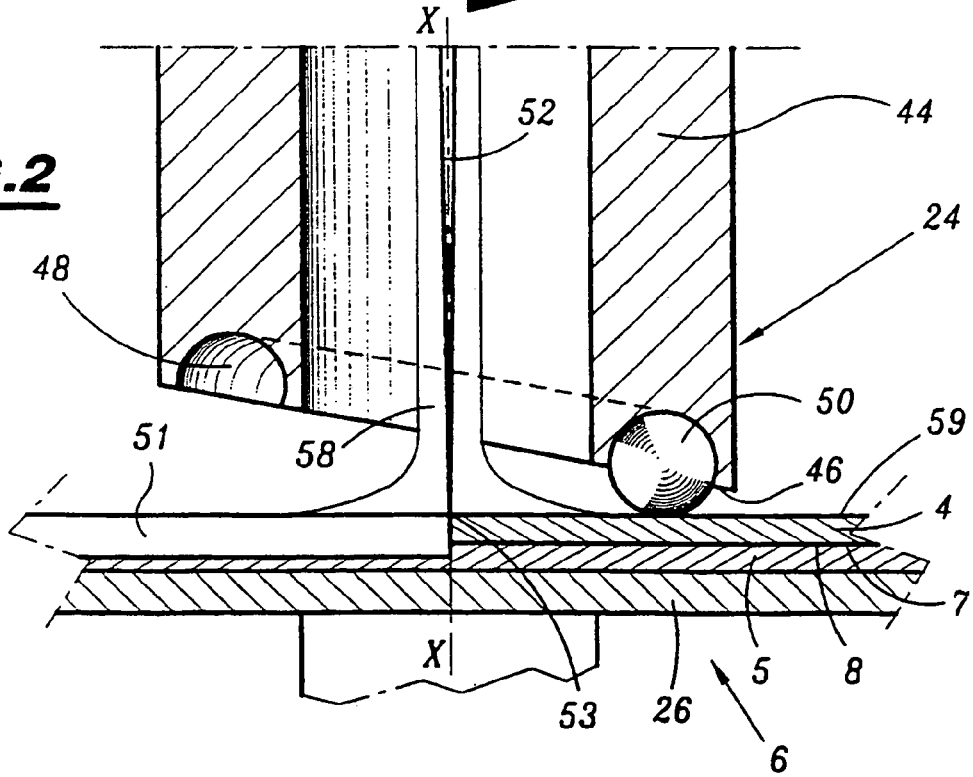
FIG. 2 is an enlarged diagrammatic view in section on the line II—II of FIG. 1.

As illustrated more particularly in FIG. 2, the pressing mechanism 24 comprises a hollow tube 44, with a circular base, which is coaxial with the rod 30 and which surrounds the head 18 and the nozzle 22. This tube 44, borne by the mount 34, extends the latter downwards and therefore towards the zone 6 of overlap.

The lower edge face 46 of this tube 44 is equipped with an open-faced annular runway 48 in which a ball 50 is retained. The ball 50 can travel freely in this runway 50. A lower part of the ball 50 projects downwards from the edge face 46.

The edge face 46 of the tube 44 and the runway 48 are inclined with respect to a plane that is transverse to the axis X—X of the tube 44 and are therefore inclined with respect to the zone 6 of overlap.

The ball 50 is pressed, by the tube 44 and the structure 14, against the sheet 4 in the region of the zone 6 of overlap.

The sheet 5 rests on the base 26 which extends, underneath this sheet-5, substantially along the entire length of a straight welded seam 51 to be produced orthogonally to the plane of FIG. 1.

To weld the sheets 4 and 5 together at their surfaces 7 and 8 in the zone 6 of overlap, the head 18 focuses a laser beam 52 emitted by the source 16 in the zone 6 of overlap. This laser beam 52 strikes the zone 6 of overlap substantially orthogonally at an impingement region 53. The beam 52 melts the sheet 4 as it passes through it, then reaches the sheet 5 where it locally melts the steel without passing through the sheet 5.

To form the straight welded seam 51 which does not go all the way through, the structure 14 which bears the head 18 is displaced horizontally along the edges of the plates 4 and 5, as depicted diagrammatically by the arrow D in FIG. 2, that is to say orthogonally to the plane of FIG. 1. The head 18, the nozzle 22 and the pressing mechanism 24 are secured to the structure 14 during this displacement parallel to the zone 6 of overlap. The beam 52 and therefore the impingement region 53 are displaced in the sense and direction of the arrow D. After the laser beam 52 has passed, the molten metal solidifies to form the welded seam 51.

During the rectilinear displacement of the structure 14, the ball 50, subject to the displacement of the head 18, runs along the sheet 4 and remains ahead of the impingement region 53, with respect to the sense of displacement of this region 53. Thus, the ball 50 lies to the right of the region 53 in FIG. 2. The ball 50 which rolls along the sheet 4 presses the surface 7 of the sheet 4 onto the surface 8 of the sheet 5, this sheet 5 being retained by, the base 26. Thus, the constraint on the clearance between the parts 4 and 5 in the zone 6 of overlap is complied with and it is possible to form the seam 51.

Behind the impingement region 53, with respect to the sense of displacement D, that is to say to the left in FIG. 2, the sheets 4 and 5 are held pressed together by the welded seam 51.

The nozzle 22 forms a stream 58 of inert gas around the laser beam 52. This stream strikes the upper surface 59 of the sheet 4 to protect the weld pool formed.

The nature of the support structure 14 allows the head 18 and the pressing mechanism 24 to be brought into a predetermined welding position and then allows these items to be displaced along a predetermined welding path. The pressing mechanism 24 is subject to the displacements of the head 18 and therefore of the impingement region 53, in directions parallel to the zone 6 of overlap.

The position of the head 18 in a direction orthogonal to the zone 6 of overlap may be altered independently of that of the pressing mechanism 24, as indicated by the arrows 42.

The inclination of the runway 48 gives the ball 50 a preferred position, because this ball tends to locate itself at the lowermost point on this runway 48, that is to say to the right in FIG. 2. Thus, by making the tube 44 pivot about the axis X—X of the rod 30, as depicted diagrammatically by the arrows 40 in FIG. 1, it is possible for the ball 50 always to be placed ahead of the zone 53 of impingement of the beam 52 irrespective of the shape of the welded seam 51 to be produced.

Figure 3:
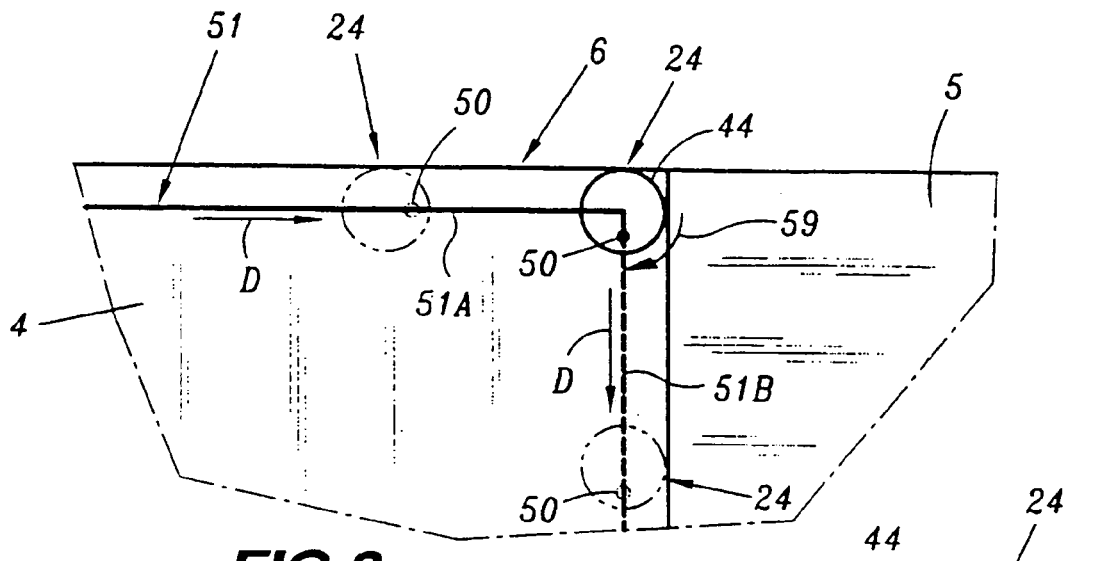
FIG. 3 is a partial plan view of two overlapping sheets which diagrammatically illustrates one use of the installation of FIG. 1.

By way of example, FIG. 3 illustrates the production of a welded seam 51 containing a right angle.

The pressing mechanism 24 is depicted in solid line at this right angle after a first rectilinear part 51A of the seam 51 has been produced and before a second part 51B of the seam 51, orthogonal to the part 51A, is produced. The pivoting of the tube 44 through a quarter turn in the clockwise direction in FIG. 3, as depicted diagrammatically by the arrow 59, allows the ball 50 to be brought into the appropriate position (at the bottom in FIG. 3) to form the second part 51B (in broken line) of the seam 51. The pressing mechanism 24 is depicted in chain line in its two positions corresponding respectively to the formation of the parts 51A and 51B of the welded seam.

The installation 2 therefore makes it possible, by transparency-welding, to produce laser-welded seams of varying shapes on sheets which overlap over relatively long lengths. The local pressing mechanism 24 allows these welded seams to be produced relatively economically without using a large number of rams for clamping the parts 4 and 5.

The displacements of the structure 14, of the various elements of which it is composed, and of the head 18 may be produced by conventional means such as rams and/or electric motors.

The operation of such an installation may be carried out entirely by robots, or automated using a control unit connected to the various motors and rams.

According to an alternative form which has not been depicted, the mount 34 and therefore the tube 44 may be mounted so that they are free to rotate about the axis X—X on the rod 30. In this case, the ball 50 automatically positions itself behind the region 53 with respect to the sense of displacement of the head 18 in a direction parallel to the zone 6 of overlap. Thus, the ball 50 is automatically orientated behind the region 53 in the direction of displacement of the head 18, whatever this direction may be, and without there being a need for means for making the mount 34 rotate about the axis X—X. This result is obtained by automatic rotation of the tube 44 about its axis X—X when there is a change in sense and/or direction of displacement of the head 18.

Figure 4:
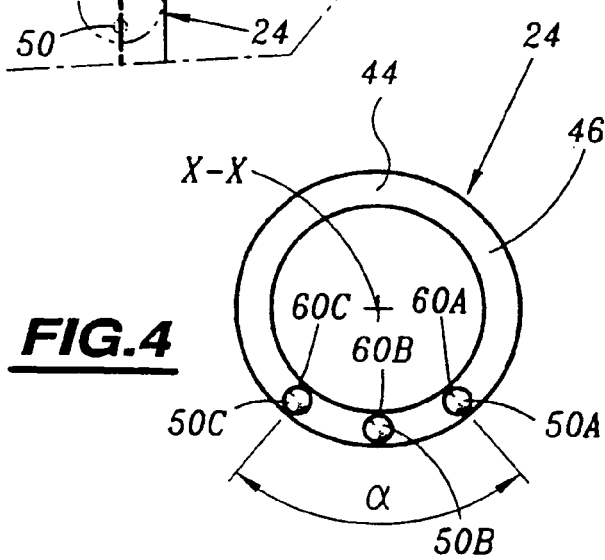
FIG. 4 is a diagrammatic view from below which illustrates an alternative form of the pressing mechanism of the installation of FIG. 1.

According to another alternative form which is illustrated in FIG. 4, the lower edge face 46 of the tube 44 is substantially orthogonal to the axis X—X of the tube 44. Three housings 60A, 60B and 60C are formed in this edge face 46. Each of these housings holds a ball 50A, 50B and 50C, respectively, and is of a shape that mates with that of the corresponding ball. These balls are intended, like the ball 50 of FIGS. 1 to 3, to roll along the sheet 4 ahead of the impingement region 53.

The housings 60A, 60B and 60C are formed uniformly in a region of the edge face 46 of the tube 44 that subtends an angle α. This alternative form allows the surfaces 7 and 8 of the sheets 4 and 5 to be pressed together over a broader region, ahead of the region 53 of impingement of the laser beam 52.

The shape of the housings 60A, 60B and 60C allows the balls 50A, 50B and 50C to be positioned with precision ahead of the impingement region 53.

In alternative forms which have not been depicted, the number of rolling balls may be higher and the subtended angle α may also be larger and be as much as 360°. In this last instance, balls are distributed uniformly over the entire edge face 46 of the tube 44 and the pressing mechanism 24 presses on the sheet 4 right around the region 53 of impingement of the laser beam 52.

In other embodiments which have not been depicted, the structure 14 consists of an articulated arm system equipped with rams, thus making it possible to weld overlapping metal parts together, in varying positions, with greater freedom.

Figure 5:
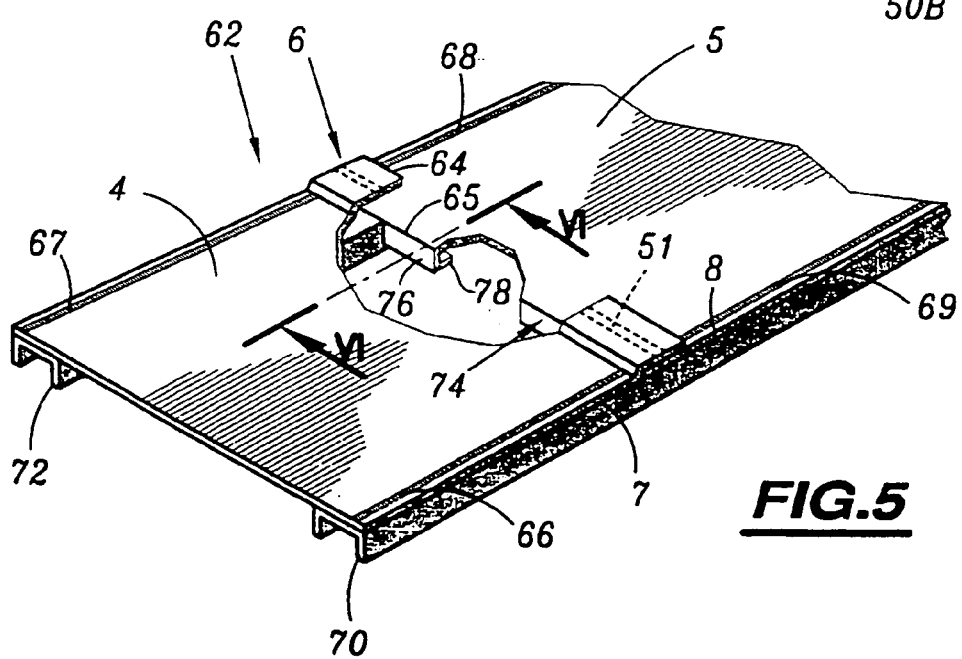
FIG. 5 is a partial perspective view with cutaway of two overlapping sheets that are to be welded together.

FIGS. 5 and 6 illustrate a collection 62 of two sheets 4 and 5 that are to be welded together along a zone 6 of overlap in which their respective front edges 64 and 65 overlap.

The sheets 4 and 5, of rectangular overall shape, have already been welded along their respective lateral edges, with welded seams 66 to 69, to two U-sections 70 and 72.

These U-sections 70 and 72 are, for example, elements of a framework of a railway vehicle body, and the sheets 4 and 5 are intended to form the exterior skin of this body. The welded seams 66 to 69 have, for example, been produced by transparency-welding using the installation 2 of FIGS. 1 to 3, the U-sections 70 and 72 therefore being supported by the rest of the aforementioned framework rather than by the base 26.

The sheets 4 and 5 are stretched between the U-sections 70 and 72. The sheets 4 and 5 are thus immobilized one with respect to the other.

The front edge 65 of the sheet 5 is extended downwards in FIGS. 5 and 6 by an L-section central part 74. This part 74 has been formed by bending the sheet 5 away from the zone 6 of overlap. This part 74 comprises, starting from the edge 65, two successive rectangular panels 76 and 78 which form an L orthogonal to the rest of the sheet 5. This part 74 increases the bending stiffness of the edge 65 of the sheet 5.

With the U-sections 70 and 72 retained by the aforementioned framework, to produce the welded seam 51 (depicted in broken line in FIG. 5) the pressing mechanism 24 of the welding installation 2 is pressed against the plate 4 in the region of the zone 6 of overlap. The stiffening part 74 allows that region of the surface 8 that lies between the U-sections 70 and 72 and in the zone 6 of overlap to resist bending so that the surfaces 7 and 8 of the sheets 4 and 5 are pressed together in the zone 6.

Thus, the stiffening part 74 makes it possible to form a welded seam 51 without placing a retaining support under that region of the edge 65 which projects cantilever fashion between the U-sections 70 and 72. This feature makes the transparency-welding of overlapping sheets over relatively long lengths even easier.

In alternative forms which have not been depicted, the stiffening parts may differ in shape and may in particular be formed by thickened regions of sheet.

It is possible to join together in turn several sheets which have stiffening parts 74. Thus, in the case of sheets which have stiffening parts 74 only at their front edge, a first sheet is connected at an overlap between its rear edge and the front edge of a second sheet, the rear edge of this second sheet being itself connected with overlap to the front edge of a third sheet, and so on.

Such sheets with stiffening parts 74 can be used to cover railway vehicle body frameworks.

FIG. 7 diagrammatically illustrates a railway vehicle body 81 which essentially comprises a chassis 82, a top or roof 83 and two side walls 84.

As illustrated more specifically in FIG. 8, the roof 83 comprises a support framework 840 comprising bowed transverse beams 85 which are arranged uniformly one after the other along the entire length of the body 81, and over which an external skin 86 is fixed.

This skin 86 comprises corrugated sheets, two of which are depicted in FIG. 8. These two sheets 87 and 88 are welded along a zone 89 of overlap that runs longitudinally with respect to the body 81, that is to say orthogonally to the plane of FIGS. 7 and 8. The sheets 87 and 88 have been welded together by virtue of parts 74 provided on the sheet 88, in each space between beams 85. As before, these stiffening parts have allowed the sheets 87 and 88 to be welded together in zones where they project cantilever fashion.

Such sheets equipped with stiffening parts may also be used to form the chassis 2.

The invention claimed is:

1. A method of laser welding at least first and second sheets, the method comprising the steps of:
    placing the sheets one above another along a zone of overlap of the sheets such that at least a first region of the first sheet projects, cantilever fashion, into the zone of overlap, wherein at least the first of the sheets comprises, near the zone of overlap, stiffening means designed to resist the bending of the first sheet along the zone of overlap, the stiffening means being located near the cantilevered region;

pressing a pressing mechanism of a laser welding installation against a second region of the second sheet facing the first region of the first sheet so as to hold the sheets in contact with one another in said zone of overlap while maintaining said first region cantilevered; and welding the sheets together along said zone of overlap.

2. The method according to claim 1, characterized in that the stiffening means comprises a profiled part (74) formed as an integral part of the first sheet (5; 88).

3. The method according to claim 2, characterized in that the profiled part (74) is formed by bending the first sheet (5; 88) away from the zone (6; 89) of overlap, close thereto.

4. The method according to claim 2, characterized in that the profiled part is a thickened part of the first sheet (5; 88).

5. The method according to claim 1, characterized in that a laser beam (52) emitted by the welding installation (2) passes through the second sheet (4; 87) to weld it to the first sheet (5; 88) at those of their surfaces which face one another in the zone (6; 89) of overlap, the method thus constituting a laser transparency-welding method.

6. A railway vehicle body (81) comprising at least one support framework (840) and an external skin (86), the external skin (86) comprising a collection of sheets (87; 88) welded together at zones (89) of overlap and welded to the support framework (840), characterized in that welds connecting the sheets of the skin together are produced by the method according to claim 1.

7. A railway vehicle body (81) comprising at least one support framework (840) and an external skin (86), the external skin (86) comprising a collection of sheets (87; 88) welded together at zones (89) of overlap and welded to the support framework (840), characterized in that welds connecting the sheets of the skin together are produced by the method according to claim 5.

* * * * *